US012743987B2

(12) United States Patent
Tang et al.

(10) Patent No.: US 12,743,987 B2
(45) Date of Patent: Sep. 22, 2026

(54) RATE-DEPENDENT SWITCHABLE EQUALIZERS FOR DISPLAY DEVICES

(71) Applicant: Texas Instruments Incorporated, Dallas, TX (US)

(72) Inventors: Yonghui Tang, Plano, TX (US); Charles Michael Campbell, Lucas, TX (US); Mustafa Ulvi Erdogan, Allen, TX (US); Douglas Edward Wente, Murphy, TX (US); Yanli Fan, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 200 days.

(21) Appl. No.: 17/526,710

(22) Filed: Nov. 15, 2021

(65) Prior Publication Data

US 2022/0157222 A1 May 19, 2022

Related U.S. Application Data

(60) Provisional application No. 63/115,625, filed on Nov. 19, 2020.

(51) Int. Cl.
*G09G 3/20* (2006.01)

(52) U.S. Cl.
CPC ..... *G09G 3/2096* (2013.01); *G09G 2370/047* (2013.01); *G09G 2370/12* (2013.01)

(58) Field of Classification Search
CPC ........... G09G 3/2096; G09G 2370/047; G09G 2370/12
See application file for complete search history.

(56) References Cited

U.S. PATENT DOCUMENTS 7,545,834 B1 * 6/2009 Guo ........................ H03F 3/211 330/252
9,374,250 B1 * 6/2016 Musah .................... H04L 25/14
9,940,298 B2 * 4/2018 Campbell ........... G06F 13/4081
10,855,242 B1 * 12/2020 Kan ......................... H03G 5/24
10,866,915 B2 * 12/2020 Chan ................... G06F 13/4022
11,019,392 B2 * 5/2021 Khan. P ........... H04N 21/44004
11,386,030 B2 * 7/2022 Lin ..................... G06F 13/4282
2010/0149416 A1 * 6/2010 Sato ....................... G09G 5/006 348/E11.022
2013/0250180 A1 * 9/2013 Wang ............... H04N 21/43635 348/E7.004
2018/0198647 A1 * 7/2018 Norimatsu ........ H04L 25/03038
2020/0052933 A1 * 2/2020 Lee ................... H04L 25/03057
2021/0305947 A1 * 9/2021 El Sabbagh ........ H04L 25/0272
2023/0246888 A1 * 8/2023 Wu .................. H04L 25/03878 375/230

* cited by examiner

*Primary Examiner* — Patrick N Edouard
*Assistant Examiner* — Eboni N Giles
(74) *Attorney, Agent, or Firm* — Xianghui Huang; Frank D. Cimino

(57) ABSTRACT

An example apparatus includes: a first input and a second input, a first equalizer with a third input, a fourth input, and a fifth input, the third input coupled to the first input, the fourth input coupled to the second input, a second equalizer with a sixth input, a seventh input, and an eighth input, the sixth input coupled to the first input, the seventh input coupled to the second input, and a controller coupled to the fifth input and the eighth input.

19 Claims, 9 Drawing Sheets

RATE-DEPENDENT SWITCHABLE EQUALIZERS FOR DISPLAY DEVICES

CROSS-REFERENCE TO RELATED APPLICATION

This patent application claims the benefit of and priority to U.S. Provisional Patent Application No. 63/115,625 filed Nov. 19, 2020, which is hereby incorporated herein by reference in its entirety.

TECHNICAL FIELD

This description relates generally to data equalization in receiving devices, and more particularly to rate-dependent switchable equalizers for display devices.

BACKGROUND

Receiving devices, which may include display devices such as computer monitors and televisions, may receive data using high-speed communication interfaces. Communication channels may use high-speed communication interfaces to support different ranges of capabilities of receiving devices. For example, a receiving device may use high-speed communication interfaces to support higher and wider ranges of video resolutions and refresh rates. Some high-speed communication interfaces support various communication protocols, display formats, and bandwidth capacities. Some high-speed communication interfaces may cause losses and signal distortion during transmission of data signals.

SUMMARY

For rate-dependent switchable equalizers for display devices, an example apparatus to equalize High-Definition Multimedia Interface (HDMI) display data includes a first input and a second input, a first equalizer with a third input, a fourth input, and a fifth input, the third input coupled to the first input, the fourth input coupled to the second input, a second equalizer with a sixth input, a seventh input, and an eighth input, the sixth input coupled to the first input, the seventh input coupled to the second input, and a controller coupled to the fifth input and the eighth input.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
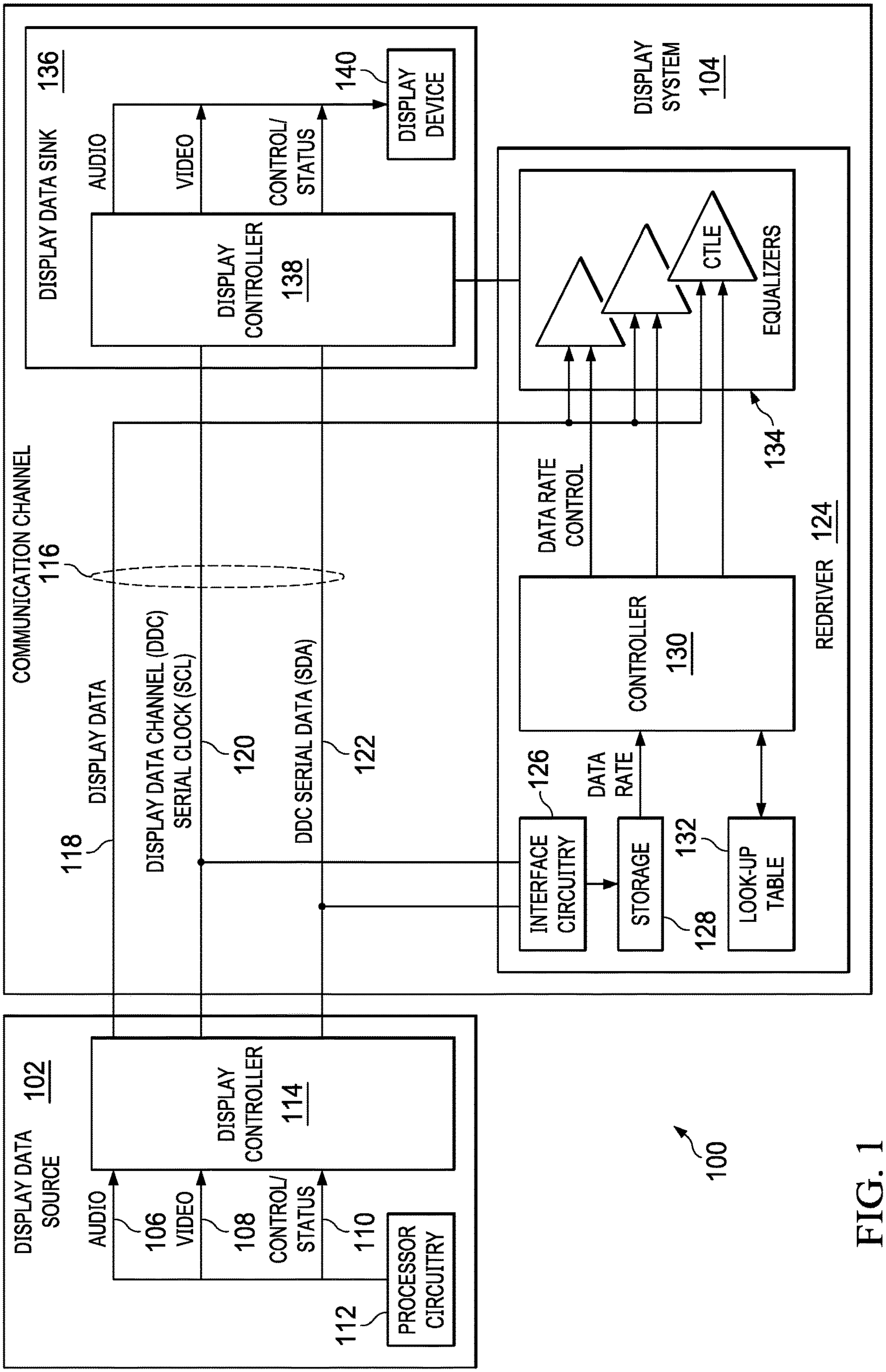
FIG. 1 is a schematic diagram of an example display system including an example redriver, which includes example rate-dependent switchable equalizers.

The drawings are not necessarily to scale.

High-speed, high-bandwidth digital communication systems can be used for a variety of technical applications such as presenting media (such as audio and/or video) on a display device using interface(s) and interconnect(s). For example, a high-speed, high-bandwidth communication system can include a transmitter (such as a display data transmitter) and a receiver (such as a display data receiver) in which the transmitter transmits display data (such as video and/or audio data) to the receiver. The receiver can output the received display data to one or more display devices. For example, the receiver can convert the display data into video and/or audio data. The display device can present the video on a display and/or output the audio using an audio device (such as a speaker). In some such examples, the transmitter can be implemented by a display source (such as a display data source including a display controller) such as a gaming console, a set-top box, a streaming media device, etc. The receiver can be implemented by a display system such as a monitor, a projector, a television, etc. A communication system (such as a digital communication system) can be implemented using display interface(s), which may include a Video Graphics Array (VGA) interface, a Digital Visual Interface (DVI) interface, a High-Definition Multimedia Interface (HDMI®), a Universal Serial Bus (USB) interface, a DisplayPort interface, etc. For example, the display source and the display system can be connected and/or otherwise communicatively coupled together by interconnect(s) (such as a cable, a wire, etc.), which can implement a display interface. In some such examples, the display source and the display system can be coupled together with an HDMI® cable, which can be used to implement an HDMI® interface.

Display interfaces, such as HDMI®, are audio and/or video interfaces for transmitting data (such as HDMI display data) from a source (such as a transmitter, a display source, etc.) to a sink (such as a receiver, a display sink, etc.). HDMI® interfaces can be used to transmit video data (such as uncompressed video data) and/or audio data (such as uncompressed or compressed audio data) from an HDMI®- compliant source device (such as a display controller) to an HDMI®-compatible sink device (such as a computer monitor, a video projector, a digital television, a digital audio device, etc.). In some examples, the display controller can be included in a gaming console, a set-top box, a streaming media device, a storage device, etc.

Transmitted signals in a digital communication system can exhibit frequency-dependent attenuation. For example, signals transmitted in high-speed, high-bandwidth digital communication systems (such as HDMI®, USB, etc., communication systems) can be high-frequency signals that become more attenuated with respect to low-frequency signals of other types of digital communication systems. In some such examples, a redriver (such as redriver circuitry, a redriver integrated circuit (IC), etc.) can receive the signals from a transmitter, boost amplitudes of the high-frequency portions of the signals, and output the boosted signals to a receiver. For example, the redriver can boost the amplitudes of the high-frequency portions of the signals from the transmitter to reduce the effects of the frequency-dependent attenuation caused by the interconnect(s) of the transmitter and the receiver. In some such examples, the redriver (also referred to as a repeater IC) can regenerate a signal from the transmitter to boost the signal quality of high-speed interfaces, which can include DVI, HDMI®, USB, DisplayPort, etc.

Redrivers may include an equalizer (such as equalizer circuitry, an equalizer IC, etc.) to amplify high-frequency signal components of signals (such as display signals) while attenuating low-frequency signal components of the signals. The equalizer may be configured for a specified data rate (such as a display data rate) of the signals. For example, a display device that is compatible with a previous HDMI® specification (such as HDMI® specification version 1.4b, HDMI® specification 2.0b, etc.) may include a redriver having an equalizer configured to support the previous HDMI® specification. In some such examples, the equalizer may be configured for a data rate as low as 270 megabits per second (Mbps) for 480i video. Subsequent HDMI® specifications (such as HDMI® specification 2.1 or later) enable expanded data rates (such as up to 12 gigabits per second (Gbps) per channel).

Some HDMI®-compatible display devices may support different HDMI® specifications, but the display devices may not support each specification with the same level of performance, efficiency, and/or signal quality. For example, a television may include a receiver that is configured to receive display signals at 270 Mbps (such as receiver configured for HDMI® 1.4) with a first performance level and display signals at 12 Gbps (such as a receiver configured for HDMI® 2.1) with a second performance level, and the first performance level can be less than the second performance level. Supporting wide ranges of data rates with improved performance, efficiency, and/or signal quality presents challenges for an equalizer to process display signals with optimized and/or otherwise improved performance, efficiency, and/or signal quality for all data rates in the supported range. For example, an equalizer of an HDMI®-compatible display device may have improved signal integrity for a narrow range of data rates and suffer performance loss for other data rates. In some examples, the performance loss can include higher jitter and lower eye openings, which may result in the display device presenting display data with reduced quality.

Examples described herein include a redriver that includes a plurality of equalizers to optimize and/or otherwise improve performance of a communication channel (such as a display communication channel) for different data rates in a wide range of data rates (such as a range of data rates of 270 Mbps to 12 Gbps or any other range of data rates). In some described examples, the redriver can include two or more equalizers. In some described examples, one(s) of the two or more equalizers can be implemented as continuous time linear equalizers, which can be configured to implement continuous time linear equalization.

In some described examples, the redriver can include at least three equalizers coupled to a communication channel. For example, each of the at least three equalizers can be optimized and/or otherwise configured for a different data rate. In some examples, a first equalizer can be optimized and/or otherwise configured for lower data rates, a second equalizer can be optimized and/or otherwise configured for higher data rates, and a third equalizer can be optimized and/or otherwise configured for data rates between the lower data rates and the higher data rates (such as medium or intermediate data rates).

In some described examples, the redriver can include two or more equalizers whose outputs are coupled together. For example, the redriver can include at least a first equalizer configured for low data rates, a second equalizer configured for medium or intermediate data rates, and a third equalizer configured for high data rates. In some examples, in response to a determination that the data rate of a communication channel is a low data rate, the redriver can select the first equalizer to process and output display data to a display device. In some examples, in response to a determination that the data rate associated with a communication channel is a medium data rate, the redriver can select the first equalizer and the second equalizer to process and output display data to the display device. In some examples, in response to a determination that the data rate associated with a communication channel is a high data rate, the redriver can select the first equalizer, the second equalizer, and the third equalizer to process and output display data to the display device. Advantageously, examples described herein can achieve data transfers at various data rates with improved signal integrity and reduced performance loss.

FIG. 1 is a schematic diagram of an example system 100 including an example display data source 102 and an example display system 104. In this example, the display data source 102 can generate and transmit display data to be displayed and/or otherwise presented by the display system 104. For example, the display system 104 can present display data to user(s), viewer(s), etc.

In some examples, the display data source 102 is a gaming console, a set-top box, a streaming media device, memory, or any other type of source, generator, and/or provider of display data. For example, the display data can include audio data 106, video data 108, and/or control and/or status data 110 generated by processor circuitry 112 of the display data source 102. In some examples, the processor circuitry 112 can generate and/or otherwise output the audio data 106, the video data 108, and/or the control/status data 110 to a first display controller 114. The first display controller 114 can output the audio data 106, the video data 108, and/or the control/status data 110 to the display system 104. In this example, output(s) of the processor circuitry 112 is/are coupled to input(s) of the first display controller 114.

The audio data 106 can be uncompressed audio data such as audio data transmitted via DVI, VGA, HDMI®, USB, DisplayPort, etc. For example, the audio data 106 can be any type of uncompressed audio data such as Waveform Audio File (WAV) (such as audio data in a WAV audio format), Audio Interchange File Format (AIFF) (such as audio data in an AIFF audio format), etc. In some examples, the audio data 106 can be compressed audio data such as MP3 audio data (such as audio data in an MP3 or MPEG-1 Audio Layer 3 audio format), Advanced Audio Coding (AAC) audio data (such as audio data in an AAC audio format), Free Lossless Audio Codec (FLAC) audio data (such as audio data in a FLAC audio format), Apple® Lossless Audio Codec (ALAC) audio data (such as audio data in an ALAC audio format), Ogg Vorbis (such as audio data in an Ogg Vorbis audio format), Direct Stream Digital (DSD) (such as audio data in a DSD format), etc.

In some examples, the video data 108 can be uncompressed video data such as video data transmitted via a display interface such as DVI, VGA, HDMI, USB, DisplayPort, etc. In some examples, the video data 108 can be compressed video data. For example, the video data 108 can be MP4 video data (such as video data in an MP4 or MPEG-4 Part 14 video format), QuickTime video data (such as video data in a MOV video format), Windows Media Video (WMV) video data (such as video data in a WMV video format), Audio Video Interleave (AVI) video data (such as video data in an AVI video format), etc. In some examples, the video data 108 may be video data in any other video format such as Advanced Video Codec High Definition (AVCHD), Flash Video (FLV), Flash MP4 Video File (F4V), Small Web Format (SWF), etc.

In some examples, the control/status data 110 can be display data channel (DDC) control and/or status data. For example, the control/status data 110 can include a DDC serial clock (SCL), DDC serial data (SDA), etc., and/or combination(s) thereof. In some examples, the processor circuitry 112 and/or the first display controller 114 can be implemented by analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as field programmable gate array (s) (FPGA(s)).

In this example, output(s) of the display data source 102 is/are coupled to input(s) of the display system 104. For example, the display data source 102 can be coupled to the display system 104 via one or more interconnects (such as one or more DVI, VGA, HDMI, USB, DisplayPort, etc., cables). Connections between the display data source 102 and the display system 104 can implement an example communication channel 116. For example, the communication channel 116 can implement a display channel, a display data channel, a data bus, a digital communication channel, etc.

In this example, the first display controller 114, and/or, more generally, the display data source 102, output example display data 118, example SCL(s) 120, and example SDA 122 to the display system 104. The display data 118 can be compressed video, uncompressed video, compressed audio, uncompressed audio, etc., and/or combination(s) thereof. For example, the display data 118 can include the audio data 106, the video data 108, etc., and/or combination(s) thereof. In some examples, the display data 118 are implemented by signals that carry the display data 118. For example, the signals that carry the display data 118 can be transition-minimized differential signaling (TMDS) signals or any other type of signals.

The SCL(s) 120 are clock signal(s). The SDA 122 are data signal(s). For example, the SCL(s) 120 and/or the SDA 122 can be implemented using the Inter-Integrated Circuit (I2C or $I^2C$) protocol. In some examples, the SDA 122 can include data associated with a data rate of the communication channel 116.

The display system 104 includes an example redriver 124. The redriver 124 includes example interface circuitry 126, example storage 128, an example controller 130, an example look-up table 132, and example equalizers 134. In some examples, the redriver 124 can implement redriver circuitry, one or more redriver ICs, etc. Alternatively, one or more of the interface circuitry 126, the storage 128, the controller 130, the look-up table 132, and/or one(s) of the equalizers 134 may be included in the display data sink 136 or other hardware of the display system 104. In some examples, the redriver 124 can be implemented by an IC. In some examples, the redriver 124 can be implemented by more than one IC. For example, the redriver 124 can be implemented by at least a first IC and a second IC. In some examples, one(s) of the interface circuitry 126, the storage 128, the controller 130, the look-up table 132, and/or the equalizers 134 can be included in the first IC and/or the second IC.

The redriver 124 can receive signals from the first display controller 114, boost the amplitudes of the high-frequency portions of the signals, and output the boosted signals to a display data sink 136. For example, the redriver 124 can boost the amplitudes of the high-frequency portions of signals from the first display controller 114 that carry the display data 118 to reduce the effects of frequency-dependent attenuation caused by the interconnect(s) of the communication channel 116. In some examples, the redriver 124 can regenerate a signal that carries the display data 118 to boost the signal quality of high-speed interfaces such as the communication channel 116. In some examples, the redriver 124 can be implemented by analog circuit(s), digital circuit(s), logic circuit(s), programmable processor(s), programmable microcontroller(s), GPU(s), DSP(s), ASIC(s), PLD(s), FPLD(s) and/or software.

In this example, input(s) of the interface circuitry 126 is/are coupled to output(s) from the first display controller 114. In some examples, the interface circuitry 126 can be implemented using analog circuit(s), digital circuit(s), logic circuit(s), programmable processor(s), programmable microcontroller(s), GPU(s), DSP(s), ASIC(s), PLD(s), FPLD(s), and/or software. The interface circuitry 126 is configured and/or otherwise adapted to receive the SCL(s) 120 and the SDA 122.

Output(s) of the interface circuitry 126 is/are coupled to input(s) of the storage 128. In some examples, the storage 128 can be implemented by volatile memory (such as Random Access Memory (RAM) of any type, etc.), non-volatile memory (such as electrically erasable programmable read-only memory (EEPROM), flash memory, etc.) and/or mass storage device(s) (such as a hard-disk drive (HDD), a solid-state disk (SSD) drive, etc.). The storage 128 may additionally or alternatively be implemented by one or more double data rate (DDR) memories, such as DDR, DDR2, DDR3, DDR4, mobile DDR (mDDR), etc. The storage 128 can store data carried by the SCL(s) 120 and/or the SDA 122. For example, the storage 128 can include one or more registers, a bank of registers (such as a register bank), etc. In some examples, the storage 128 can store data represented by the SDA 122 in one or more registers. For example, the storage 128 can store a data rate of the communication channel 116 in a register.

Output(s) of the storage 128 is/are coupled to input(s) of the controller 130. In some examples, the controller 130 can be implemented by hardware-implemented state machine(s), analog circuit(s), digital circuit(s), logic circuit(s), programmable processor(s), programmable microcontroller(s), GPU(s), DSP(s), ASIC(s), PLD(s), FPLD(s), and/or software. The controller 130 can retrieve, receive, and/or otherwise obtain data from the storage 128. For example, the controller 130 can receive a data rate of the communication channel 116 from the storage 128.

Input(s) and/or output(s) of the controller 130 is/are coupled to respective output(s) and/or input(s) of the look-up table 132. In some examples, the look-up table 132 can be implemented by volatile memory, non-volatile memory, and/or mass storage device(s). In this example, the look-up table 132 is an organized body of related data. For example, the look-up table 132 can be an organized body of related data, regardless of the manner in which the data or the organized body thereof is represented. In some examples, the organized body of related data can be in the form of one or more of a table, a map, a grid, a datagram, a file, a list or in any other form.

In some examples, the look-up table 132 includes mappings, associations, etc., of data rates and date rate control. For example, the look-up table 132 can include a first mapping of a first data rate and a first selection of one(s) of the equalizers 134 to achieve equalization of the signals that carry the display data 118. In some examples, the first data rate can correspond to a first bandwidth defined by a display interface specification (such as a bandwidth defined by HDMI® 1.4, a 3 Gbps bandwidth defined by HDMI® 2.1, etc.). The look-up table 132 can include a second mapping of a second data rate and a second selection of one(s) of the equalizers 134. For example, the second data rate can correspond to a second bandwidth associated with a display interface specification (such as a bandwidth defined by HDMI® 2.0, a 6 Gbps bandwidth defined by HDMI® 2.1, etc.). The look-up table 132 can include a third mapping of a third data rate and a third selection of one(s) of the equalizers 134. For example, the third data rate can correspond to a third bandwidth specified by a display interface specification (such as a bandwidth of 8, 10, or 12 Gbps as defined by HDMI® 2.1, etc.).

In some examples, the first data rate can be a relatively low data rate with respect to the second data rate or the third data rate. For example, in response to a mapping of a data rate of the communication channel 116 to the first data rate in the look-up table 132, the controller 130 can select a first one of the equalizers 134. In some examples, the first one of the equalizers 134 can be configured to optimize and/or otherwise improve the equalization of signals that are transmitted using the first data rate. In some examples, in response to a mapping of a data rate of the communication channel 116 to the second data rate in the look-up table 132, the controller 130 can select the first one and/or a second one of the equalizers 134. In some examples, the second one of the equalizers 134 can be configured to optimize and/or otherwise improve the equalization of signals that are transmitted using the second data rate. In some example, the controller 130 can select the first and second ones of the equalizers 134 to equalize the signals that are transmitted using the second data rate.

Output(s) of the controller 130 is/are coupled to respective input(s) (such as control input(s), select input(s), etc.) of the equalizers 134. Output(s) of the first display controller 114 is/are coupled to input(s) of the equalizers 134. Output(s) of the equalizers 134 is/are coupled to input(s) of the display data sink 136. For example, the output(s) of the equalizers 134 can be configured to output the display data 118 to the display data sink 136. The equalizers 134 of the illustrated example can be implemented using analog circuit(s), digital circuit(s), logic circuit(s), processor(s), software, and/or combination(s) thereof. In this example, there are three of the equalizers 134. Alternatively, the redriver 124 may include fewer or more than three of the equalizers 134 (such as including two of the equalizers 134, four of the equalizers 134, eight of the equalizers 134, etc.).

In this example, the equalizers 134 are continuous time linear equalization (CTLE) equalizers. For example, one(s) of the equalizers 134 can implement CTLE. In some examples, the one(s) of the equalizers 134 can attenuate low-frequency signal component(s) of a signal (such as the signal that carries the display data 118). The one(s) of the equalizers 134 can amplify signal component(s) around the Nyquist frequency of the signal. The one(s) of the equalizers 134 can filter (or filter off) higher frequencies of the signal. In some examples, the one(s) of the equalizers 134 can implement one or more filters (such as a linear filter, a peak or peaking filter, a linear peak or peaking filter, etc.). Advantageously, the equalizers 134 can reduce distortions resulting from lossy channels (such as the communication channel 116). Alternatively, one or more of the equalizers 134 may be a different type of equalizer.

The display data sink 136 is a sink of display data (such as a display sink, a DVI sink, a HDMI® sink, etc.). For example, the display data sink 136 can be implemented by analog circuit(s), digital circuit(s), logic circuit(s), programmable processor(s), programmable microcontroller(s), GPU(s), DSP(s), ASIC(s), PLD(s), FPLD(s), and/or software.

The display data sink 136 includes a second example display controller 138 and an example display device 140. In some examples, the second display controller 138 can be implemented by analog circuit(s), digital circuit(s), logic circuit(s), programmable processor(s), programmable microcontroller(s), GPU(s), DSP(s), ASIC(s), PLD(s), FPLD(s), and/or software. In some examples, the display device 140 can be implemented by a light emitting diode (LED) display, an organic light emitting diode (OLED) display, a liquid crystal display (LCD), a cathode ray tube (CRT) display, an in-place switching (IPS) display, a touch-screen, and/or one or more speakers. Output(s) of the second display controller 138 is/are coupled to input(s) of the display device 140. For example, the second display controller 138 can output the audio data 106, the video data 108, and/or the control/status data 110 to the display device 140.

Advantageously, the equalizers 134 of the redriver 124, and/or, more generally, the display system 104, can implement rate-dependent switchable equalizers. For example, the display data source 102 can transmit the display data 118 to the display data sink 136 via the redriver 124 at a first data rate based on a first bandwidth of the communication channel 116. In some examples, the first display controller 114 can transmit the display data 118 to the equalizers 134 at the first data rate. The first display controller 114 can transmit the SDA 122 to the interface circuitry 126. The first display controller 114 can generate the SDA 122 to indicate that a data rate at which the first display controller 114 is transmitting the display data 118 is the first data rate. The interface circuitry 126 can receive the SDA 122; convert signals from the first display controller 114 into the SDA 122; and/or cause the SDA 122, or portion(s) thereof, to be stored in the memory 128. The controller 130 can query (such as asynchronously or synchronously query) the storage 128 for the SDA 122, or portion(s) of the SDA 122 that correspond to the data rate of the communication channel 116. The controller 130 can map the SDA 122, or the portion(s) of the SDA 122, to a first data rate of the communication channel 116. The controller 130 can select one or more of the equalizers 134 to process the display data 118 and output the processed display data 118 to the display data sink 136. In response to the selection, the selected one(s) of the equalizers 134 can output the processed display data 118 to the second display controller 138 with reduced jitter, improved signal integrity, and/or otherwise improved signal performance. The second display controller 138 can output the display data 118 to the display device 140 for display, presentation, etc., to user(s), viewer(s), etc.

Figure 2:
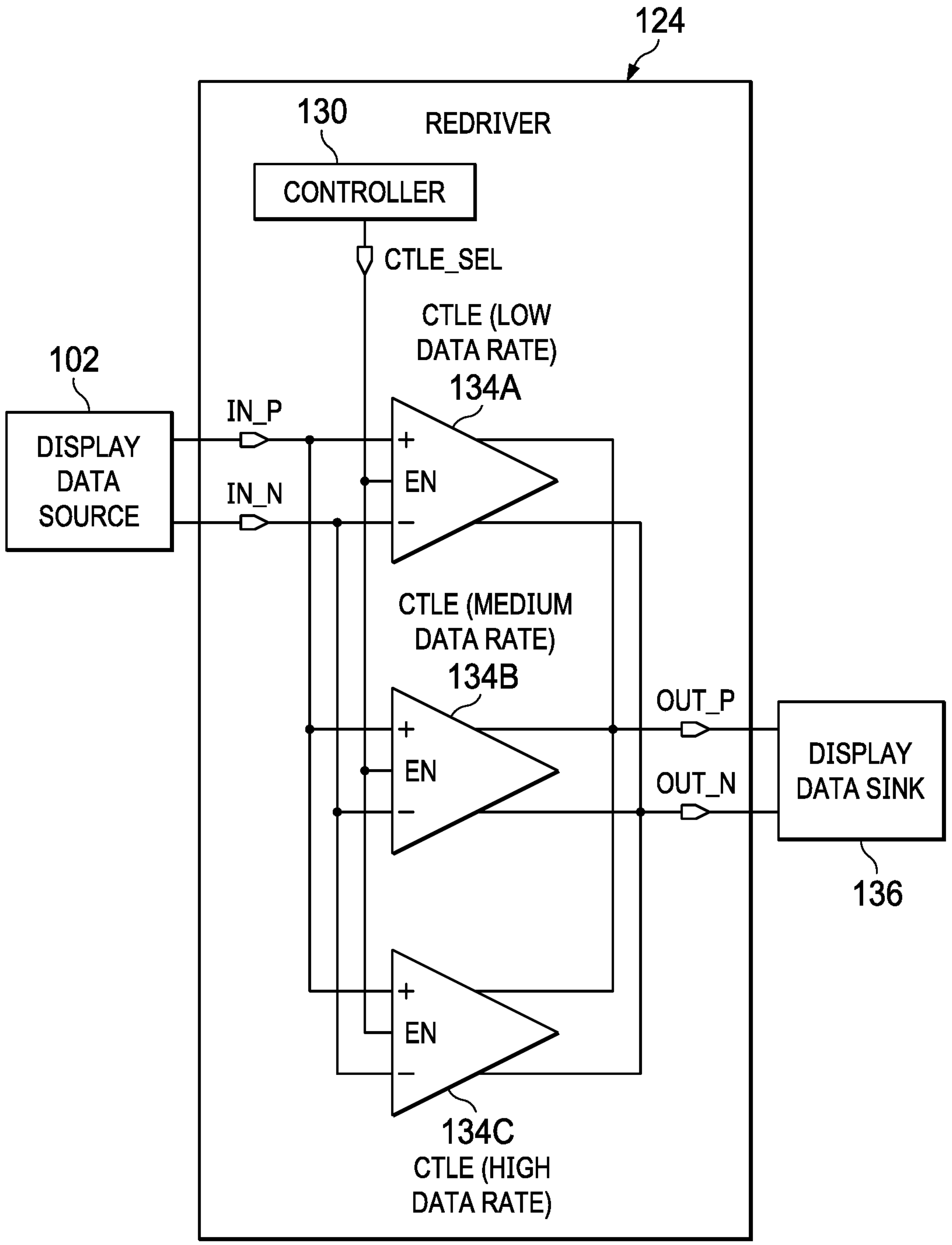
FIG. 2 is a schematic diagram of an example implementation of the rate-dependent switchable equalizers of FIG. 1.

FIG. 2 is a schematic diagram of an example implementation of the equalizers 134 of FIG. 1. More specifically, FIG. 2 illustrates a portion of the redriver 124 that includes equalizers 134 and some of the connections to equalizers 134. The illustrated example of FIG. 2 includes the display data source 102, the controller 130, and the display data sink 136 of FIG. 1. The illustrated example of FIG. 2 includes a first example equalizer 134A, a second example equalizer 134B, and a third example equalizer 134C. For example, the first equalizer 134A, the second equalizer 134B, and the third equalizer 134C can implement the equalizers 134 of FIG. 1.

Inputs (identified by IN_P and IN_N) of the redriver 124 are coupled to inputs (identified by + and –) of the equalizers 134A, 134B, 134C. The inputs of the redriver 124 are coupled to outputs of the display data source 102. Outputs (identified by CTLE_SEL) of the controller 130 are coupled to inputs (identified by EN) of the equalizers 134A, 134B, 134C. Outputs (identified by OUT_P and OUT_N) of the redriver 124 (such as one or more outputs (identified by + and –) of the equalizers 134A, 134B, 134C) are coupled to inputs of the display data sink 136. The outputs of the redriver 124 (identified by OUT_P and OUT_N) are differential voltage signals. For example, the voltage difference between OUT_P and OUT_N can be approximately +5V (such as a voltage in a range of +4.7V to +5.3V or any other voltage range). Alternatively, the voltage difference between OUT_P and OUT_N may be any other voltage and/or in any other voltage range.

The first equalizer 134A can be configured, adapted, and/or otherwise optimized to facilitate the transfer of the display data 118 using a first data rate of the communication channel 116 of FIG. 1. The second equalizer 134B can be configured, adapted, and/or otherwise optimized to facilitate the transfer of the display data 118 using a second data rate of the communication channel 116. The third equalizer 134C can be configured, adapted, and/or otherwise optimized to facilitate the transfer of the display data 118 using a third data rate of the communication channel 116. In this example, the first data rate is a relatively low data rate of the communication channel 116, such as a data rate defined by HDMI® 1.4 (such as 3.4 Gbps) or a 3 Gbps data rate as defined by HDMI® 2.1. In this example, the second data rate is a medium or intermediate data rate of the communication channel 116, such as a data rate defined by HDMI® 2.0 (such as 6 Gbps) or a 6 Gbps data rate as defined by HDMI® 2.1. In this example, the third data rate is a relatively high data rate of the communication channel 116, such as an 8, 10, or 12 Gbps data rate as defined by HDMI® 2.1.

In example operation, in response to a determination by the controller 130 that the data rate of the communication channel 116 is the first data rate that corresponds to a low bandwidth (such as a low bandwidth setting, parameter, or configuration) of the communication channel 116, the controller 130 can select the first equalizer 134A. For example, the controller 130 can output a logic high signal (such as a signal corresponding to a digital or logic '1') to the enable input of the first equalizer 134A and output logic low signals (such as a signal corresponding to a digital or logic '0') to the disable inputs of the second equalizer 134B and the third equalizer 134C. In some examples, in response to the logic high signal, the first equalizer 134A is enabled. For example, the first equalizer 134A can equalize the display data 118 and output the display data 118 to the display data sink 136. In some examples, in response to the logic low signals, the second equalizer 134B and the third equalizer 134C are disabled.

In some examples, in response to a determination by the controller 130 that the data rate of the communication channel 116 is the third data rate that corresponds to a high bandwidth, the controller 130 can select the first equalizer 134A, the second equalizer 134B, and the third equalizer 134C. For example, the controller 130 can output logic high signals to the enable inputs of the first equalizer 134A, the second equalizer 134B, and the third equalizer 134C. In some examples, in response to the logic high signals, the first equalizer 134A, the second equalizer 134B, and the third equalizer 134C are enabled. For example, the first equalizer 134A, the second equalizer 134B, and the third equalizer 134C can equalize the display data 118 in parallel and output the display data 118 to the display data sink 136.

Figure 3:
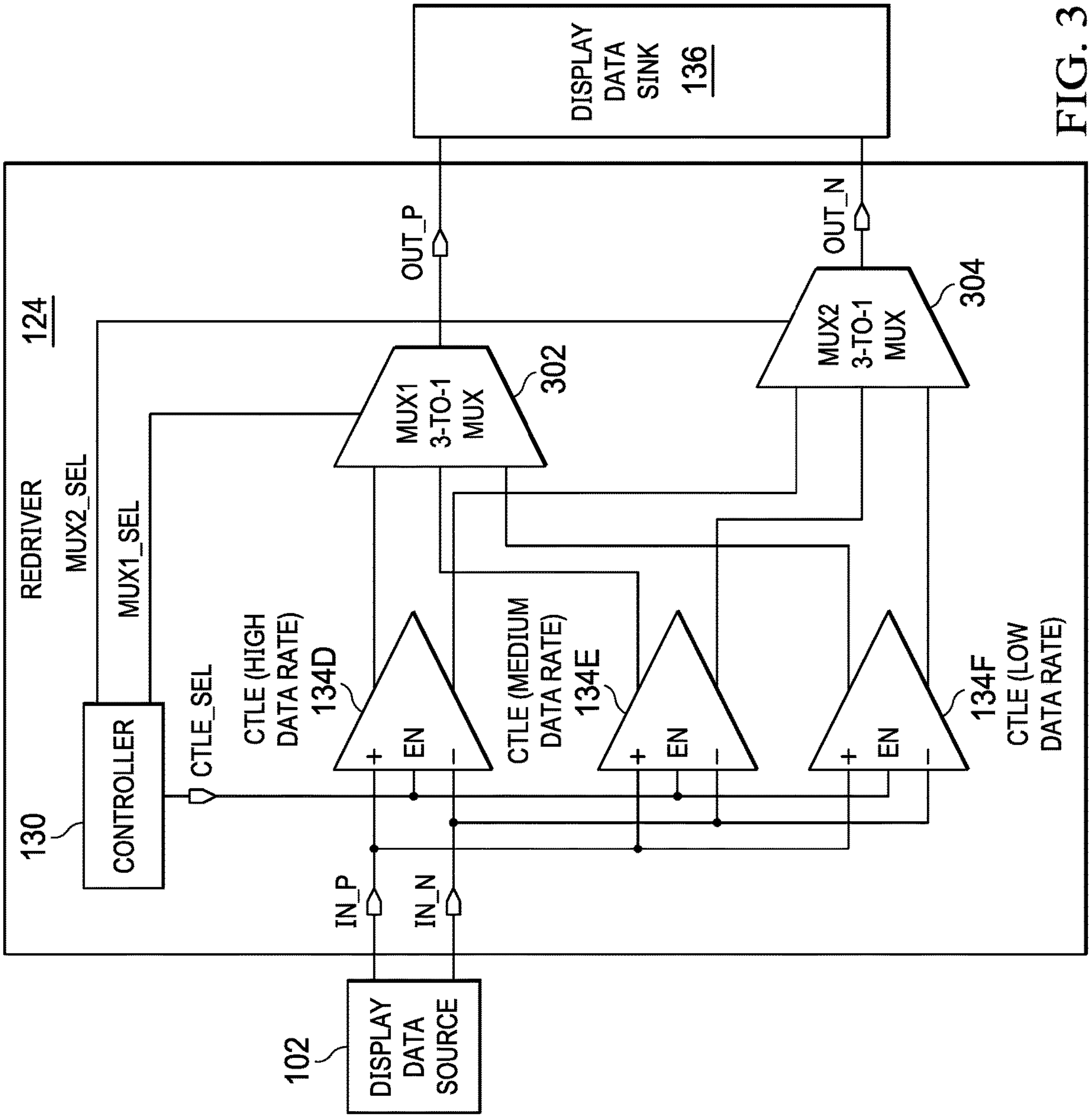
FIG. 3 is a schematic diagram of another example implementation of the rate-dependent switchable equalizers of FIG. 1.

FIG. 3 is a schematic diagram of another example implementation of the equalizers 134 of FIG. 1. More specifically, FIG. 3 illustrates a portion of the redriver 124 that includes equalizers 134, multiplexers 302 and 304 and some of the connections to/from such devices. The illustrated example of FIG. 3 includes the display data source 102, the controller 130, and the display data sink 136 of FIG. 1. The illustrated example of FIG. 3 includes a fourth example equalizer 134D, a fifth example equalizer 134E, and a sixth example equalizer 134F. These equalizers may be implemented the same as the equalizers (134A, 134B, and 134C) as those illustrated in FIG. 2. For example, the fourth equalizer 134D, the fifth equalizer 134E, and the sixth equalizer 134F can implement the equalizers 134 of FIG. 1. The illustrated example of FIG. 3 includes a first example multiplexer 302 (identified by MUX1) and a second example multiplexer 304 (identified by MUX2).

Inputs (identified by IN_P and IN_N) of the redriver 124 are coupled to inputs (identified by + and –) of the equalizers 134D, 134E, 134F. The inputs of the redriver 124 are coupled to outputs of the display data source 102. Outputs (identified by CTLE_SEL) of the controller 130 are coupled to inputs (identified by EN) of the equalizers 134D, 134E, 134F. First outputs (identified by +) of the equalizers 134D, 134E, 134F are coupled to first inputs of the first multiplexer 302 and the second multiplexer 304. Second outputs (identified by –) of the equalizers 134D, 134E, 134F are coupled to second inputs of the first multiplexer 302 and the second multiplexer 304. An output (identified by MUX1_SEL) of the controller 130 is coupled to an input (such as a select or selection input, a control input, etc.) of the first multiplexer 302. An output (identified by MUX2 SEL) of the controller 130 is coupled to an input (such as a select or selection input, a control input, etc.) of the second multiplexer 304. Outputs of the multiplexers 302, 304 are coupled to outputs (identified by OUT_P and OUT_N) of the redriver 124. The outputs of the redriver 124 are coupled to inputs of the display data sink 136.

In this example, the first multiplexer 302 and the second multiplexer 304 can be implemented by multiplexer circuitry. For example, the first multiplexer 302 and/or the second multiplexer 304 can be implemented by analog circuit(s), digital circuit(s), logic circuit(s), programmable processor(s), programmable microcontroller(s), GPU(s), DSP(s), ASIC(s), PLD(s), FPLD(s), and/or software. In some examples, the first multiplexer 302 and/or the second multiplexer 304 can be implemented by one or more field-effect transistors (FETs) (such as high-speed FETs, high-speed FET switches, etc.). In this example, the outputs of the equalizers 134A, 134B, 134C are 3-to-1 muxed to a single output. Alternatively, the redriver 124 may include fewer or more multiplexers than depicted in the example of FIG. 3.

The fourth equalizer 134D can be configured, adapted, and/or otherwise optimized to facilitate the transfer of the display data 118 based on a first data rate of the communication channel 116 of FIG. 1. For example, the first data rate can correspond to a first rate at which data is being transmitted in the communication channel 116. In some examples, the fourth equalizer 134D is configured, adapted, etc., to have optimized and/or otherwise improved performance when equalizing the display data 118 for a first range of data rates that includes the first data rate.

The fifth equalizer 134E can be configured, adapted, and/or otherwise optimized to facilitate the transfer of the display data 118 based on a second data rate of the communication channel 116. In some examples, the fifth equalizer 134E is configured, adapted, etc., to have optimized and/or otherwise improved performance when equalizing the display data 118 for a second range of data rates that includes the second data rate.

The sixth equalizer 134F can be configured, adapted, and/or otherwise optimized to facilitate the transfer of the display data 118 based on a third data rate of the communication channel 116. In some examples, the sixth equalizer 134F is configured, adapted, etc., to have optimized and/or otherwise improved performance when equalizing the display data 118 for a third range of data rates that includes the third data rate.

In this example, the first data rate is a relatively low data rate at which data can be transmitted/received utilizing the communication channel 116. For example, the first data rate can be a data rate less than 3.4 Gbps. In this example, the second data rate is a medium or intermediate data rate at data can be transmitted/received utilizing the communication channel 116. For example, the second data rate can be a data rate between 3 Gbps and 6 Gbps, inclusive. In this example, the third data rate is a relatively high data rate at which data can be transmitted/received utilizing the communication channel 116. For example, the third data rate can be a data rate greater than 6 Gbps (such as 8, 10, or 12 Gbps).

In the illustrated example of FIG. 3, one(s) of the equalizers 134D, 134E, 134F are active and/or otherwise enabled depending on the data rate associated with the communication channel 116. For example, the controller 130 may select only one of the equalizers 134D, 134E, 134F based on the data rate associated with the communication channel 116. In some examples, the controller 130 can select more than one of the equalizers 134D, 134E, 134F based on the data rate associated with the communication channel 116.

In example operation, in response to a determination by the controller 130 that the data rate of the communication channel 116 is the first data rate (such as the low data rate), the controller 130 can select the sixth equalizer 134F. For example, the controller 130 can output a logic high signal to enable the input/output of the sixth equalizer 134F and output logic low signals to disable the inputs/outputs of the fourth equalizer 134D and the fifth equalizer 134E. In some examples, in response to the logic high signal, the sixth equalizer 134F is enabled. The controller 130 can generate the MUX1_SEL and MUX2_SEL signals to select the sixth equalizer 134F. For example, the controller 130 can generate the MUX1_SEL signal to instruct the first multiplexer 302 to select the input of the first multiplexer 302 that corresponds to an output (such as the + output) of the sixth equalizer 134F; and the controller 130 can generate the MUX2_SEL signal to direct the second multiplexer 304 to select the input of the second multiplexer 304 that corresponds to an output (such as the – output) of the sixth equalizer 134F. In some examples, the sixth equalizer 134F can equalize the display data 118 and output the display data 118 to the first multiplexer 302 and the second multiplexer 304. The first multiplexer 302 and the second multiplexer 304 can output the display data 118 to the display data sink 136. In some examples, in response to the logic low signals, the fourth equalizer 134D and the fifth equalizer 134E are disabled.

In example operation, in response to a determination by the controller 130 that the data rate of the communication channel 116 is the second data rate (such as the medium data rate), the controller 130 can select the fifth equalizer 134E. For example, the controller 130 can output a logic high signal to the enable input/output of the fifth equalizer 134E and output logic low signals to the disable inputs of the fourth equalizer 134D and the sixth equalizer 134F. In some examples, in response to the logic high signal, the fifth equalizer 134E is enabled. The controller 130 can generate the MUX1_SEL and MUX2_SEL signals to select the fifth equalizer 134E. For example, the controller 130 can generate the MUX1_SEL signal to instruct the first multiplexer 302 to select the input of the first multiplexer 302 that corresponds to an output (such as the + output) of the fifth equalizer 134E. The controller 130 can generate the MUX2_SEL signal to direct the second multiplexer 304 to select the input of the second multiplexer 304 that corresponds to an output (such as the – output) of the fifth equalizer 134E. In some examples, the fifth equalizer 134E can equalize the display data 118 and output the display data 118 to the first multiplexer 302 and the second multiplexer 304. The first multiplexer 302 and the second multiplexer 304 can output the display data 118 to the display data sink 136. In some examples, in response to the logic low signals, the fourth equalizer 134D and the sixth equalizer 134F are disabled.

In example operation, in response to a determination by the controller 130 that the data rate of the communication channel 116 is the third data rate (such as the high data rate), the controller 130 can select the fourth equalizer 134D. For example, the controller 130 can output a logic high signal to the enable input of the fourth equalizer 134D and output logic low signals to the enable inputs of the fifth equalizer 134E and the sixth equalizer 134F. In some examples, in response to the logic high signal, the fourth equalizer 134D is enabled. The controller 130 can generate the MUX1_SEL and MUX2_SEL signals to select the fourth equalizer 134D. For example, the controller 130 can generate the MUX1_SEL signal to cause the first multiplexer 302 to select the input of the first multiplexer 302 that corresponds to an output (such as the + output) of the fourth equalizer 134D. The controller 130 can generate the MUX2_SEL signal to cause the second multiplexer 304 to select the input of the second multiplexer 304 that corresponds to an output (such as the – output) of the fourth equalizer 134D. In some examples, the fourth equalizer 134D can equalize the display data 118 and output the display data 118 to the first multiplexer 302 and the second multiplexer 304. The first multiplexer 302 and the second multiplexer 304 can output the display data 118 to the display data sink 136. In some examples, in response to the logic low signals, the fifth equalizer 134E and the sixth equalizer 134F are disabled.

Figure 4:
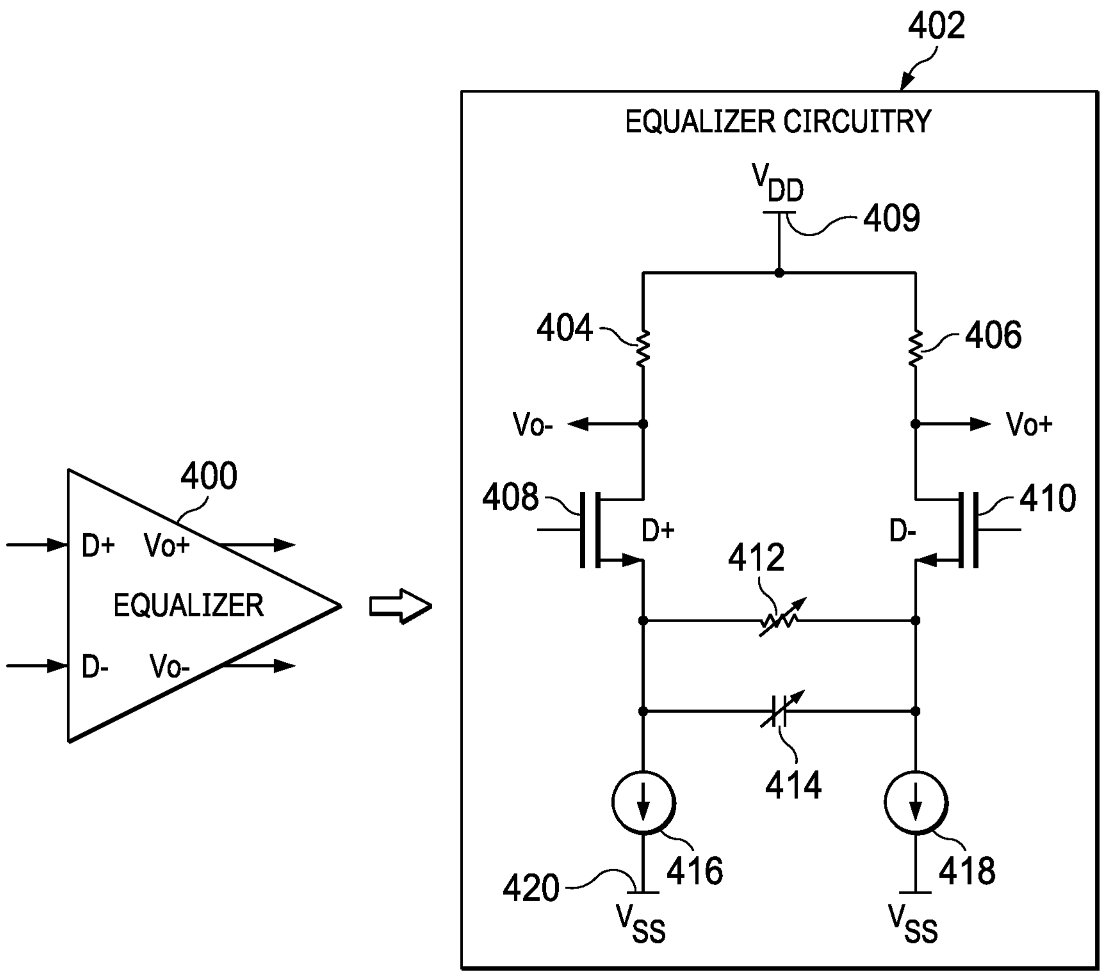
FIG. 4 is a schematic diagram of an example implementation of one(s) of the rate-dependent switchable equalizers of FIG. 1.

FIG. 4 is a schematic diagram of an example implementation of an equalizer 400. In some examples, the equalizer 400 can implement one(s) of the equalizers 134 of FIG. 1. In some examples, the equalizer 400 can implement the first equalizer 134A, the second equalizer 134B, and/or the third equalizer 134C of FIG. 2. In some examples, the equalizer 400 can implement the fourth equalizer 134D, the fifth equalizer 134E, and/or the sixth equalizer 134F of FIG. 3. For example, inputs (identified by D+ and D−) can correspond to the inputs (identified by + and −) of the equalizers 134A, 134B, 134C of FIG. 2 and/or the inputs (identified by + and −) of the equalizers 134D, 134E, 134F of FIG. 3. In some examples, the inputs (identified by D+ and D−) can correspond to signals that carry the display data 118 of FIG. 1. In some examples, outputs (identified by Vo+ and Vo−) can correspond to the outputs (identified by + and −) of the equalizers 134A, 134B, 134C of FIG. 2 and/or the outputs (identified by + and −) of the equalizers 134D, 134E, 134F of FIG. 3.

The equalizer 400 of the illustrated example can be implemented by example equalizer circuitry 402. The equalizer circuitry 402 includes a first example resistor 404, a second example resistor 406, a first example transistor 408, a second example transistor 410, an example variable resistor 412, an example variable capacitor 414, a first example current source 416, and a second example current source 418. The first transistor 408 and the second transistor 410 are N-channel FETs. Alternatively, the first transistor 408 and/or the second transistor 410 may be n-type/p-type/n-type (NPN) bipolar junction transistors (BJTs), N-channel metal-oxide-semiconductor field-effect transistors (MOSFETs), N-channel insulated-gate bipolar transistors (IGBTs), N-channel junction field effect transistors (JFETs), etc. Alternatively, the equalizer circuitry 402 may be implemented using a P-channel FET, p-type/n-type/p-type (PNP) BJT, a P-channel MOSFET, a P-channel IGBT, and/or a P-channel JFET for the first transistor 408 and/or the second transistor 410.

A first terminal (such as a first resistor terminal) of the first resistor 404 is coupled to a first current terminal (such as a drain or drain terminal) of the first transistor 408. An input (such as the D+ input) of the equalizer 400 is coupled to a control terminal (such as a gate terminal) of the first transistor 408. A second current terminal (such as a source or a source terminal) of the first transistor 408 is coupled to respective first terminals of the variable resistor 412, the variable capacitor 414, and the first current source 416.

A first terminal (such as a first resistor terminal) of the second resistor 406 is coupled to a first current terminal (such as a drain or drain terminal) of the second transistor 410. A second terminal of the second resistor 406 is coupled to a second terminal of the first resistor 404. The second terminals of the first resistor 404 and the second resistor 406 are coupled to a voltage supply 409 (identified by VDD). An input (such as the D− input) of the equalizer 400 is coupled to a control terminal (such as a gate terminal) of the second transistor 410. A second current terminal (such as a source or a source terminal) of the second transistor 410 is coupled to respective second terminals of the variable resistor 412, the variable capacitor 414, and the first current source 416. Second terminals of the first current source 416 and the second current source 418 are coupled to ground 420 (identified by VSS).

In some examples, the equalizer circuitry 402 can behave as a high-pass filter (such as a high-pass filter stage). For example, the equalizer circuitry 402 can achieve CTLE by implementing a linear high-pass filter. In example operation, the input signals (identified by D+ and D−) can pass through the high-pass filter to compensate the high-frequency loss of D+ and D− as a result of the interconnect(s) of the communication channel 116 of FIG. 1. In example operation, the variable resistor 412 and/or the variable capacitor 414 can be tuned, changed, and/or otherwise adjusted to achieve a relatively flat frequency response for the outputs (identified by Vo+ and Vo−) combining the frequency response of both interconnects and equalizer circuitry 402 that is within the signal bandwidth. For example, the variable resistor 412 and/or the variable capacitor 414 can be changed to generate the outputs of the equalizer circuitry 402 to be within a first bandwidth corresponding to a first data rate of the communication channel 116, a second bandwidth corresponding to a second data rate of the communication channel 116, a third bandwidth corresponding to a third data rate of the communication channel 116, etc. In some examples, interconnects associated with a communication channel (such as the communication channel 116 of FIG. 1) have high frequency loss while an equalizer (such as the equalizer circuitry 402) has high-frequency gain. In example operation, the equalizer circuitry 402 can compensate the high-frequency loss of the interconnects so that the overall frequency is flat with a desirable or intended signal band. The variable resistor 412 and/or the variable capacitor 414 can be tuned (such as adjusting a resistance of the variable resistor 412 and/or a capacitance of the variable capacitor 414) so that the combined frequency response is as flat as possible within the constraints of the equalizer circuitry 402, and/or, more generally, a display system (such as the display system 104).

Figure 5:
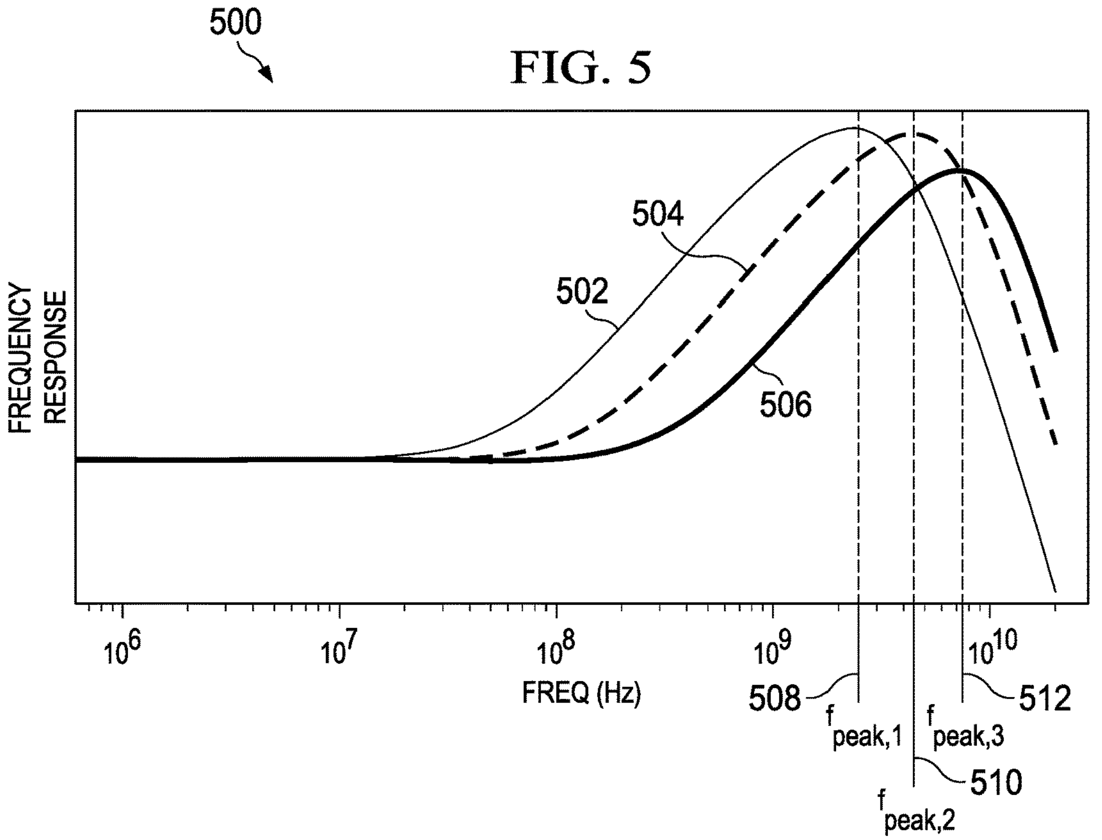
FIG. 5 is a graph of an example frequency response associated with the rate-dependent switchable equalizers of FIG. 1.

FIG. 5 is a graph 500 of example frequency responses 502, 504, 506 associated with operation(s) of the equalizers 134 of FIG. 1, the equalizers 134A, 134B, 134C of FIG. 2, and/or the equalizers 134D, 134E, 134F of FIG. 3. Graph 500 includes an x-axis that represents frequency and a y-axis that represents amplification/attenuation. The frequency responses 502, 504, 506 include a first example frequency response 502, a second example frequency response 504, and a third example frequency response 506.

The first frequency response 502 can be representative of and/or otherwise correspond to a first transfer function implemented by one or more equalizers. For example, the first transfer function can be implemented by the first equalizer 134A of FIG. 2 when the first equalizer 134A is enabled. In some examples, the first transfer function can be implemented by the sixth equalizer 134F of FIG. 3 when the sixth equalizer 134F is enabled.

The second frequency response 504 can be representative of and/or otherwise correspond to a second transfer function implemented by one or more equalizers. For example, the second transfer function can be implemented by the first equalizer 134A and the second equalizer 134B of FIG. 2 when they are enabled. In some examples, the second transfer function can be implemented by the fifth equalizer 134E when the fifth equalizer 134E is enabled.

The third frequency response 506 can be representative of and/or otherwise correspond to a third transfer function implemented by one or more equalizers. For example, the third transfer function can be implemented by the first equalizer 134A, the second equalizer 134B, and the third equalizer 134C of FIG. 2 when they are enabled. In some examples, the third transfer function can be implemented by the fourth equalizer 134D when the fourth equalizer 134D is enabled.

In the plot 500, each of the transfer functions have different rise and falling slopes, as well as different peak frequencies that can fit optimized and/or otherwise improved performance for different bands of data rates. For example, in response to enabling and/or otherwise turning on the first equalizer 134A of FIG. 2, a first peak frequency 508 (identified by $f_{peak,1}$) within a first bandwidth can be achieved. In some examples, in response to enabling the sixth equalizer 134F of FIG. 3, the first peak frequency 508 can be achieved.

In some examples, in response to enabling and/or otherwise turning on the first equalizer 134A and the second equalizer 134B of FIG. 2, a second peak frequency 510 (identified by $f_{peak,2}$) within a second bandwidth can be achieved. In some examples, in response to enabling the fifth equalizer 134E of FIG. 3, the second peak frequency 510 can be achieved.

In some examples, in response to enabling and/or otherwise turning on the first equalizer 134A, the second equalizer 134B, and the third equalizer 134C of FIG. 2, a third peak frequency 512 (identified by $f_{peak,3}$) within a third bandwidth can be achieved. In some examples, in response to enabling the fourth equalizer 134D of FIG. 3, the third peak frequency 512 can be achieved. Advantageously, in response to a determination of a data rate associated with the communication channel 116, the controller 130 can select one(s) of the equalizers 134 of FIG. 1, the equalizers 134A, 134B, 134C of FIG. 2, and/or the equalizers 134D, 134E, 134F of FIG. 3 to change a frequency response of signals that carry the display data 118 such that a peak frequency of the frequency response is within a desired bandwidth.

Figure 6:
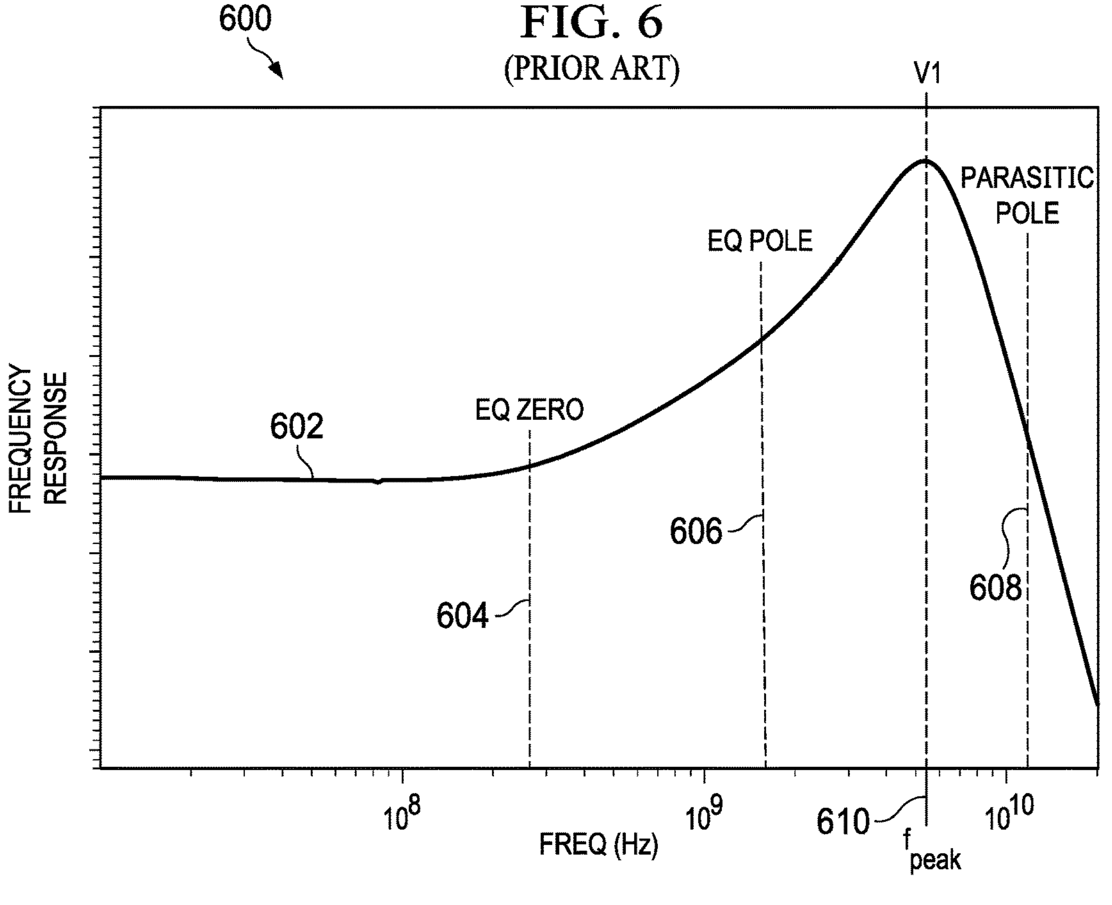
FIG. 6 (PRIOR ART)
FIG. 6 is a graph of an example frequency response associated with a conventional equalizer.

FIG. 6 is a graph 600 of an example frequency response 602 associated with a conventional equalizer (such as a conventional CTLE equalizer). Graph 600 includes an x-axis that represents frequency and a y-axis that represents amplification/attenuation. In this example, the frequency response 602 has a zero 604 (such as an equalization zero identified by EQ ZERO), a pole 606 (such as an equalization pole identified by EQ POLE), and a parasitic pole 608 (such as an equalization parasitic pole identified by PARASITIC POLE). The equalizing performance of the conventional CTLE equalizer is substantially determined by the locations of the zero 604, the pole 606, the parasitic pole 608, and a resulting peak frequency 610 (identified by $f_{peak}$). In this example, the tuning range for the zero 604, the pole 606, the parasitic pole 608, and the peak frequency 610 is relatively narrow and is not possible to optimize performance of this conventional CTLE equalizer for a wide range of data rates (such as a range from 270 Mbps to 12 Gbps). Advantageously, the redriver 124 of FIGS. 1, 2, and/or 3 overcome such limitations of the conventional CTLE equalizer. Advantageously, the redriver 124 can select one(s) of equalizers configured for optimal and/or otherwise improved equalizing performance based on a data rate of the communication channel 116. Advantageously, in response to the selection, the redriver 124 of FIGS. 1, 2, and/or 3 can change a frequency response of the equalizers 134 of FIG. 1, the equalizers 134A, 134B, 134C of FIG. 2, and/or the equalizers 134D, 134E, 134F of FIG. 3 to change a resulting peak frequency to fit within a desired or intended bandwidth of the communication channel 116.

Figure 7:
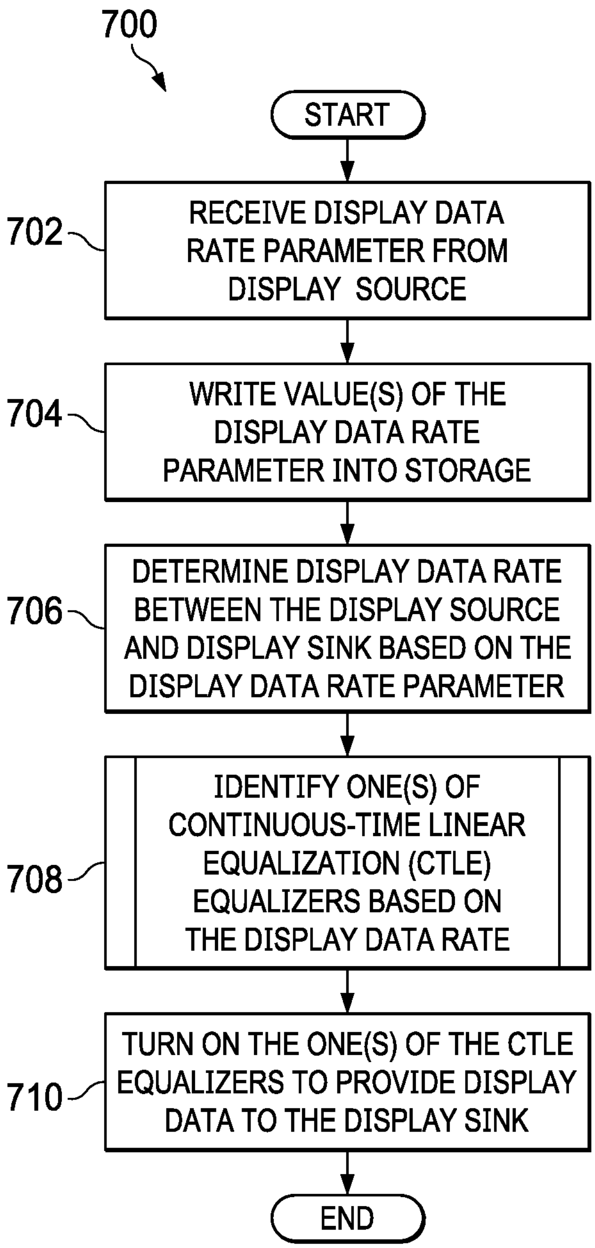
FIG. 7 is a flowchart representative of an example process that may be performed using machine readable instructions that can be executed and/or hardware configured to implement the redriver of FIG. 1, and/or, more generally, the display system of FIG. 1, to provide display data to a display sink.
Figure 8:
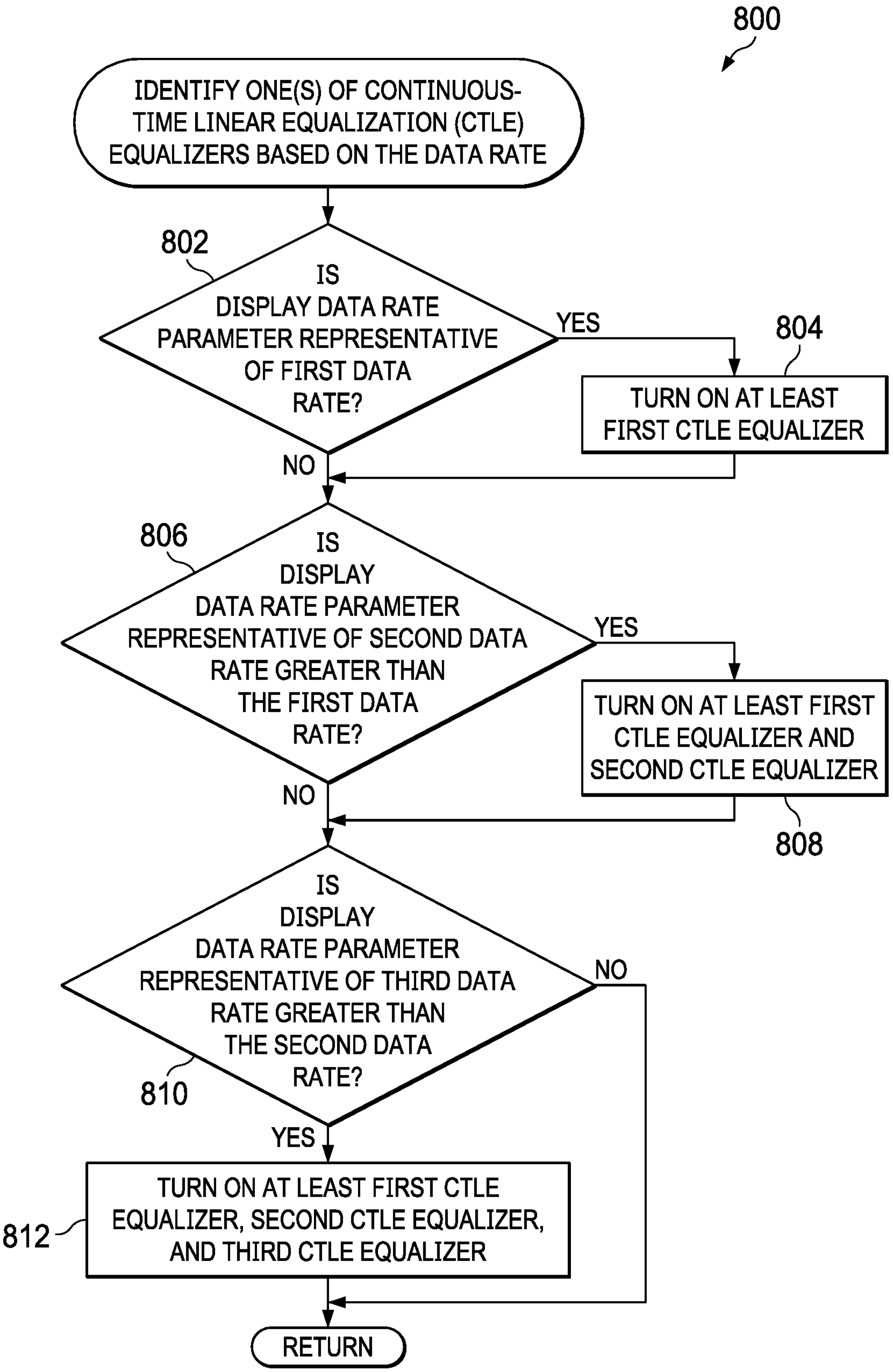
FIG. 8 is a flowchart representative of an example process that may be performed using machine readable instructions that can be executed and/or hardware configured to implement the redriver of FIG. 1, and/or, more generally, the display system of FIG. 1, to identify one(s) of continuous-time linear equalization (CTLE) equalizers based on the data rate.
Figure 9:
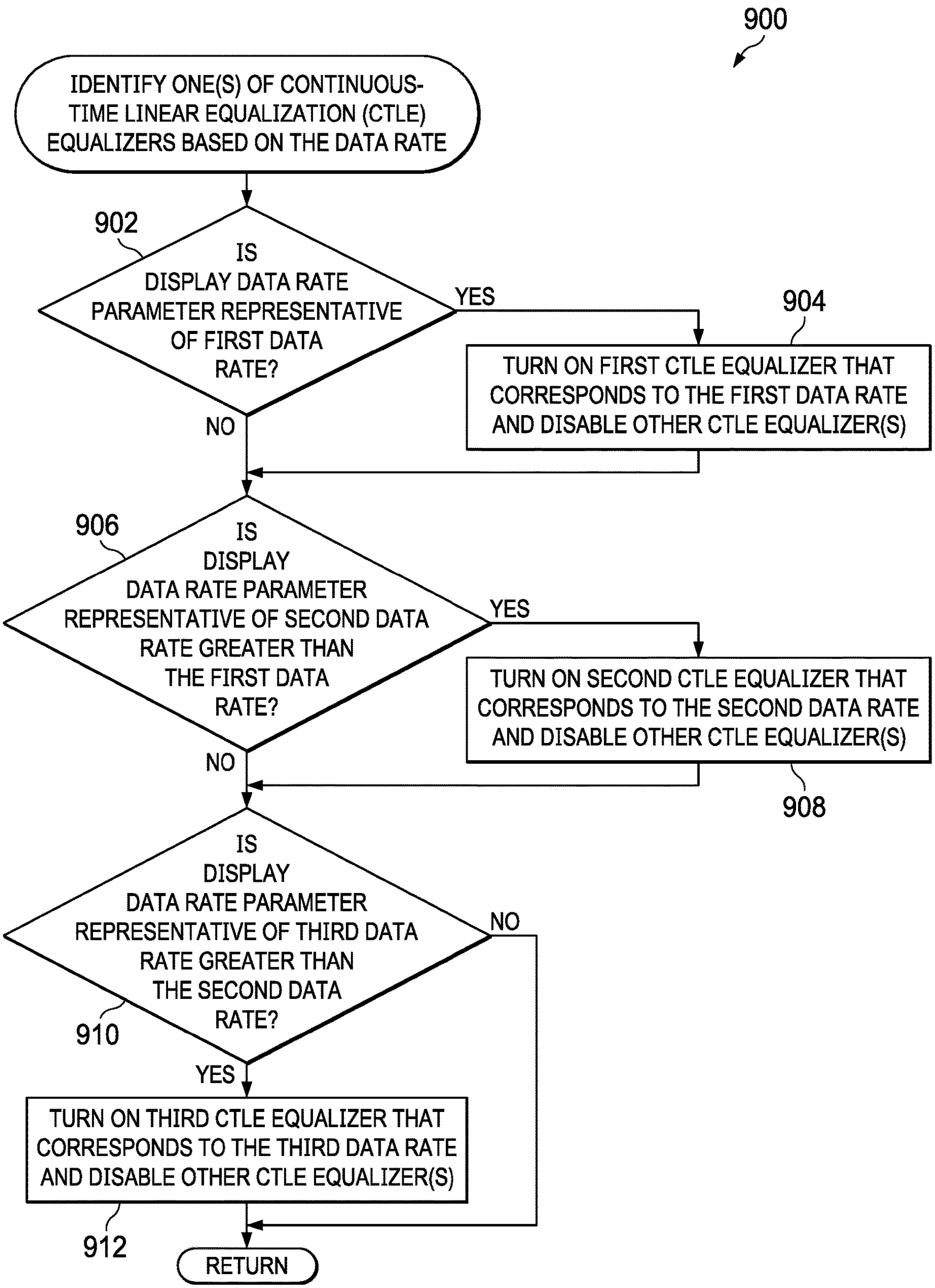
FIG. 9 is a flowchart representative of another example process that may be performed using machine readable instructions that can be executed and/or hardware configured to implement the redriver of FIG. 1, and/or, more generally, the display system of FIG. 1, to identify one(s) of continuous-time linear equalization (CTLE) equalizers based on the data rate.

Flowcharts representative of example hardware logic circuitry, machine readable instructions, hardware implemented state machines, and/or any combination thereof for implementing the redriver 124 of FIGS. 1, 2, and/or 3 are shown in FIGS. 7-9. The machine readable instructions may be one or more executable programs or portion(s) of an executable program for execution by processor circuitry, such as the processor circuitry 1012 shown in the display system 104 discussed below in connection with FIG. 10. The program may be embodied in software stored on one or more non-transitory computer readable storage media such as an HDD, an SSD, a volatile memory, or a non-volatile memory associated with processor circuitry located in one or more hardware devices, but the entire program and/or parts thereof could alternatively be executed by one or more hardware devices other than the processor circuitry and/or embodied in firmware or dedicated hardware. The non-transitory computer readable storage media may include one or more mediums located in one or more hardware devices. Further, although the example program(s) is/are described with reference to the flowcharts illustrated in FIGS. 7-9, many other methods of implementing the redriver 124 may alternatively be used. For example, the order of execution of the blocks may be changed, and/or some of the blocks described may be changed, eliminated, or combined. Additionally or alternatively, any or all of the blocks may be implemented by one or more hardware circuits (such as processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be local to one or more hardware devices (such as a single-core processor (such as a single core central processor unit (CPU)), a multi-core processor (such as a multi-core CPU), etc.) in a single machine, multiple processors distributed across multiple servers of a server rack, multiple processors distributed across one or more server racks, a CPU and/or a FPGA located in the same package (such as the same IC package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (such as portions of instructions, code, representations of code, etc.) that may be utilized to create, manufacture, and/or produce machine executable instructions. The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (such as a dynamic link library (DLL)), a software development kit (SDK), an application programming interface (API), etc., in order to execute the machine readable instructions on a particular computing device or other device. In another example, the machine readable instructions may need to be configured (such as settings stored, data input, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: Assembly, C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (such as computer and/or machine readable instructions) stored on one or more non-transitory computer and/or machine readable media such as optical storage devices, magnetic storage devices, an HDD, a flash memory, a read-only memory (ROM), a cache, a RAM of any type, a register, and/or any other storage device or storage disk in which information is stored for any duration (such as for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

FIG. 7 is a flowchart representative of an example process 700 that may be performed using machine readable instructions that can be executed and/or hardware configured to implement the redriver 124 of FIGS. 1, 2, and/or 3, and/or, more generally, the display system 104 of FIG. 1, to provide display data to a display sink. The process 700 begins at block 702, at which the redriver 124 receives a display data rate parameter from a display source. For example, the interface circuitry 126 can receive the SDA 122, which can include data representative of a display data rate parameter. In some examples, the display data rate parameter can be a data rate that the display data source 102 is utilizing to transmit the display data 118 in the communication channel 116.

At block 704, the redriver 124 writes value(s) of the display data rate parameter into storage. For example, the interface circuitry 126 can decode and/or otherwise convert the signals that carry the SDA 122 into the SDA 122. In some examples, the interface circuitry 126 can store the SDA 122 into one or more registers of the storage 128.

At block 706, the redriver 124 determines a display data rate between the display source and a display sink based on the display data rate parameter. For example, the controller 130 can retrieve value(s) from the register(s) of the storage 128. In some examples, the controller 130 can determine a data rate associated with the communication channel 116 between the display data source 102 and the display data sink 136 based on the value(s).

At block 708, the redriver 124 identifies one(s) of continuous-time linear equalization (CTLE) equalizers based on the display data rate. For example, the controller 130 can map the data rate to a selection of one(s) of the equalizers 134 in the look-up table 132. An example process that may be performed using machine readable instructions that can be executed and/or hardware configured to implement block 708 is described below in connection with FIGS. 8 and/or 9.

At block 710, the redriver 124 turns on the one(s) of the CTLE equalizers to provide display data to the display sink. For example, the controller 130 can enable one(s) of the equalizers 134 to output the display data 118 to the display data sink 136. In some examples, the display data sink 136 can present and/or otherwise output the display data 118 with the display device 140. In response to turning on the one(s) of the CTLE equalizers to provide display data to the display sink at block 710, the process 700 of FIG. 7 concludes.

FIG. 8 is a flowchart representative of an example process 800 that may be performed using machine readable instructions that can be executed and/or hardware configured to implement the redriver 124 of FIGS. 1, 2, and/or 3, and/or, more generally, the display system 104 of FIG. 1, to identify one(s) of continuous-time linear equalization (CTLE) equalizers based on the data rate. Alternatively, the process 800 of FIG. 8 may be utilized to identify any other type of equalizer based on a data rate associated with a communication channel (such as a display communication channel). In some examples, the process 800 of FIG. 8 can implement block 708 of the process 700 of FIG. 7.

The process 800 begins at block 802, at which the redriver 124 determines whether a display data rate parameter is representative of a first data rate. For example, the controller 130 can determine that a value of a display data rate parameter corresponds to a first data rate (such as a first display data rate, a first rate of display data, etc.).

If, at block 802, the redriver 124 determines that the display data rate parameter is not representative of the first data rate, control proceeds to block 806. If, at block 802, the redriver 124 determines that the display data rate parameter is representative of the first data rate, then, at block 804, the redriver 124 turns on at least a first CTLE equalizer. For example, the controller 130 can identify, based on the look-up table 132, that the value of the display data rate parameter is the first data rate. In some examples, the controller 130 can determine, based on the look-up table 132, that the first data rate is associated with a selection of the first equalizer 134A of FIG. 2. In some examples, the controller 130 can turn on the first equalizer 134A of FIG. 2 based on the determination.

At block 806, the redriver 124 determines whether a display data rate parameter is representative of a second data rate greater than the first data rate. For example, the controller 130 can determine that the value of the display data rate parameter corresponds to a second data rate, which is greater than the first data rate.

If, at block 806, the redriver 124 determines that the display data rate parameter is not representative of the second data rate, control proceeds to block 810. If, at block 806, the redriver 124 determines that the display data rate parameter is representative of the second data rate, then, at block 808, the redriver 124 turns on at least a first CTLE equalizer and a second CTLE equalizer. For example, the controller 130 can identify, based on the look-up table 132, that the value of the display data rate parameter is the second data rate. In some examples, the controller 130 can determine, based on the look-up table 132, that the second data rate is mapped to a selection of the first equalizer 134A and the second equalizer 134B of FIG. 2. In some examples, the controller 130 can turn on the first equalizer 134A and the second equalizer 134B of FIG. 2 based on the determination.

At block 810, the redriver 124 determines whether a display data rate parameter is representative of a third data rate greater than the second data rate. For example, the controller 130 can determine that the value of the display data rate parameter corresponds to a third data rate, which is greater than the second data rate.

If, at block 810, the redriver 124 determines that the display data rate parameter is not representative of the third data rate, the process 800 of FIG. 8 concludes. For example, the process 800 of FIG. 8 can return to block 710 of FIG. 7 to turn on the one(s) of the CTLE equalizers to provide display data to a display sink. If, at block 810, the redriver 124 determines that the display data rate parameter is representative of the third data rate, then, at block 812, the redriver 124 turns on at least a first CTLE equalizer, a second CTLE equalizer, and a third CTLE equalizer. For example, the controller 130 can identify, by querying the look-up table 132 with the value as an input, that the value of the display data rate parameter is the third data rate. In some examples, the controller 130 can determine, based on the look-up table 132, that the third data rate is associated with a selection of the first equalizer 134A, the second equalizer 134B, and the third equalizer 134C of FIG. 2. In some examples, the controller 130 can turn on the first equalizer 134A, the second equalizer 134B, and the third equalizer 134C of FIG. 2 based on the determination. In response to turning on at least the first CTLE equalizer, the second CTLE equalizer, and the third CTLE equalizer at block 812, the process 800 of FIG. 8 concludes.

FIG. 9 is a flowchart representative of an example process 900 that may be performed using machine readable instructions that can be executed and/or hardware configured to implement the redriver 124 of FIGS. 1, 2, and/or 3, and/or, more generally, the display system 104 of FIG. 1, to identify one(s) of continuous-time linear equalization (CTLE) equalizers based on the data rate. Alternatively, the process 900 of FIG. 9 may be utilized to identify any other type of equalizer based on a data rate associated with a communication channel (such as a display communication channel). In some examples, the process 900 of FIG. 9 can implement block 708 of the process 700 of FIG. 7.

The process 900 begins at block 902, at which the redriver 124 determines whether a display data rate parameter is representative of a first data rate. For example, the controller 130 can determine that a value of a display data rate parameter corresponds to a first data rate (such as a first display data rate, a first rate of display data, etc.).

If, at block 902, the redriver 124 determines that the display data rate parameter is not representative of the first data rate, control proceeds to block 906. If, at block 902, the redriver 124 determines that the display data rate parameter is representative of the first data rate, then, at block 904, the redriver 124 turns on a first CTLE equalizer that corresponds to the first data rate and disables other CTLE equalizer(s). For example, the controller 130 can identify, based on the look-up table 132, that the value of the display data rate parameter is the first data rate. In some examples, the controller 130 can determine, based on the look-up table 132, that the first data rate is associated with a selection of the sixth equalizer 134F of FIG. 3. In some examples, the controller 130 can turn on the sixth equalizer 134F of FIG. 3 and turn off the fourth equalizer 134D and the fifth equalizer 134E of FIG. 3 based on the determination.

At block 906, the redriver 124 determines whether a display data rate parameter is representative of a second data rate greater than the first data rate. For example, the controller 130 can determine that the value of the display data rate parameter corresponds to a second data rate, which is greater than the first data rate.

If, at block 906, the redriver 124 determines that the display data rate parameter is not representative of the second data rate, control proceeds to block 910. If, at block 906, the redriver 124 determines that the display data rate parameter is representative of the second data rate, then, at block 908, the redriver 124 turns on a second CTLE equalizer that corresponds to the second data rate and disables other CTLE equalizer(s). For example, the controller 130 can identify, based on the look-up table 132, that the value of the display data rate parameter is the second data rate. In some examples, the controller 130 can determine, based on the look-up table 132, that the second data rate is mapped to a selection of the fifth equalizer 134E of FIG. 3. In some examples, the controller 130 can turn on the fifth equalizer 134E and turn off the fourth equalizer 134D and the sixth equalizer 134F of FIG. 3 based on the determination.

At block 910, the redriver 124 determines whether a display data rate parameter is representative of a third data rate greater than the second data rate. For example, the controller 130 can determine that the value of the display data rate parameter corresponds to a third data rate, which is greater than the second data rate.

If, at block 910, the redriver 124 determines that the display data rate parameter is not representative of the third data rate, the process 900 of FIG. 9 concludes. For example, the process 900 of FIG. 9 can return to block 710 of FIG. 7 to turn on the one(s) of the CTLE equalizers to provide display data to a display sink. If, at block 910, the redriver 124 determines that the display data rate parameter is representative of the third data rate, then, at block 912, the redriver 124 turns on a third CTLE equalizer and disables other CTLE equalizer(s). For example, the controller 130 can identify, by querying the look-up table 132 with the value of the display data rate parameter as an input, that the value of the display data rate parameter is the third data rate. In some examples, the controller 130 can determine, based on the look-up table 132, that the third data rate is associated with a selection of the fourth equalizer 134D of FIG. 3. In some examples, the controller 130 can turn on the fourth equalizer 134D and turn off the fifth equalizer 134E and the sixth equalizer 134F of FIG. 3 based on the determination. In response to turning on the third CTLE equalizer that corresponds to the third data rate and disabling other CTLE equalizer(s) at block 912, the process 900 of FIG. 9 concludes.

Figure 10:
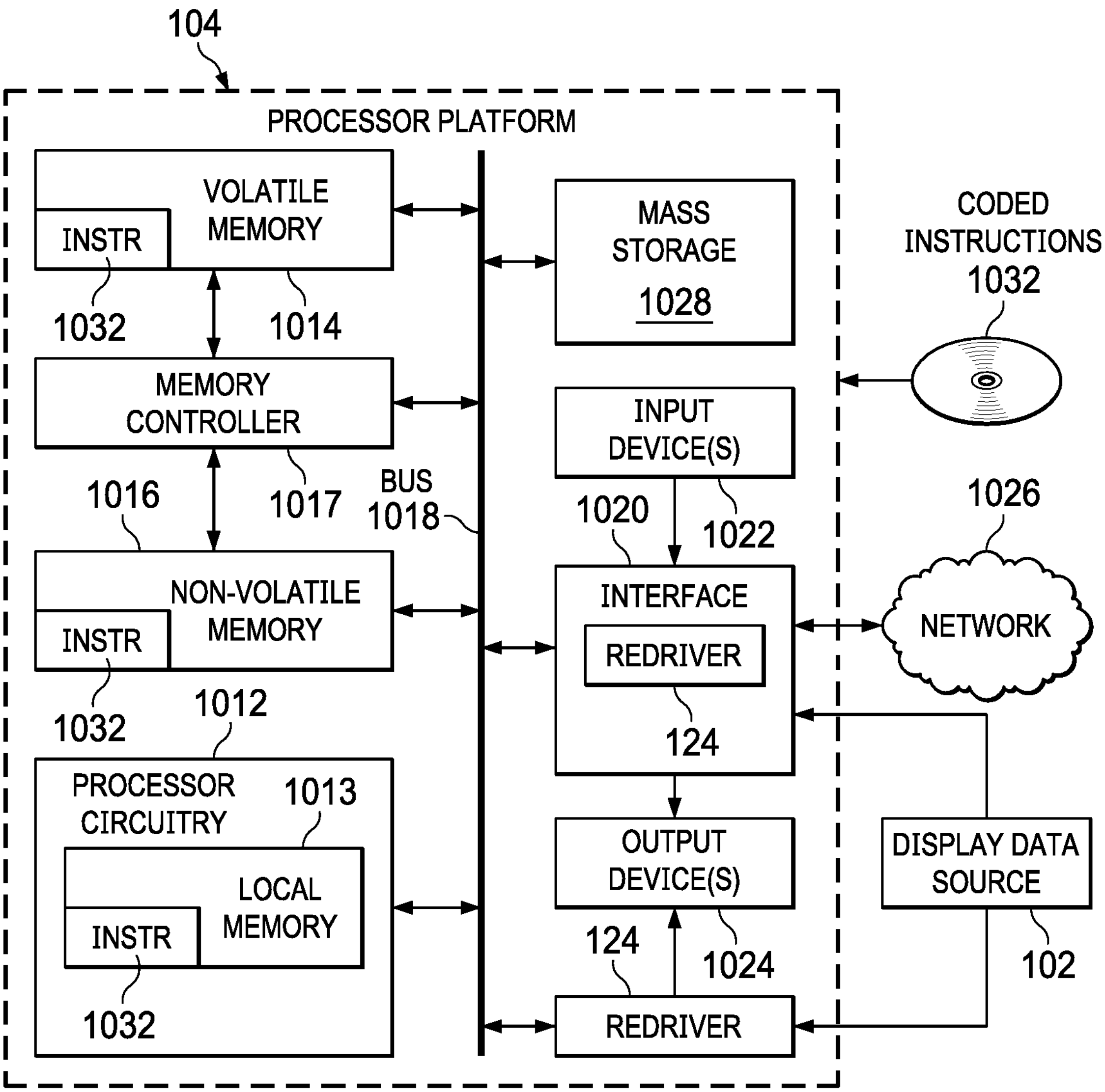
FIG. 10 is a block diagram of an example implementation of the display system of FIG. 1, which includes processor circuitry structured to execute the example machine readable instructions and/or the example operations of FIGS. 7-9 to implement the redriver of FIG. 1.

FIG. 10 is a block diagram of an example implementation of the display system 104 of FIG. 1. In this example, the display system 104 is structured to execute and/or instantiate the machine readable instructions and/or the operations of FIGS. 7-9 to implement the redriver 124 of FIGS. 1, 2, and/or 3. In this example, the display system 104 can be, for example, a television, a projector, a personal computer, a workstation, a mobile device (such as a cell phone, a smart phone, a tablet such as an iPad™), a personal digital assistant (PDA), an Internet appliance, a headset (such as an augmented reality (AR) headset, a virtual reality (VR) headset, etc.) or other wearable device, or any other type of computing device.

The display system 104 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (such as silicon based) devices.

The processor circuitry 1012 of the illustrated example includes a local memory 1013 (such as a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The display system 104 of the illustrated example also includes interface circuitry 1020. The interface circuitry 1020 may be implemented by hardware in accordance with any type of interface standard, such as Ethernet, DVI, VGA, HDMI®, DisplayPort, USB, Bluetooth®, near field communication (NFC), Peripheral Component Interconnect (PCI), and/or Peripheral Component Interconnect Express (PCIe). In some examples, the interface circuitry 1020 can implement one or more display interfaces (such as a display device interface). In this example, the interface circuitry 1020 implements the redriver 124 of FIGS. 1, 2, and/or 3.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, an infrared sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (such as an LED, an OLED, an LCD, a CRT display, an IPS display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a connector (such as a cable connector), a transmitter, a receiver, a transceiver, a modem, a residential gateway, a wireless access point, and/or a network interface to facilitate exchange of data with external machines (such as computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The display system 104 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD.

In the illustrated example, another instance of the redriver 124 is coupled to the bus 1018, the output device(s) 1024, and the display data source 102 of FIG. 1. In this example, the display data source 102 is coupled to the redriver 124 of the interface circuitry 1020, and/or, more generally, to the interface circuitry 1020.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example methods, apparatus, and articles of manufacture described herein improve performance of display systems. Examples described herein include circuitry (such as redriver circuitry) that can dynamically switch among multiple equalizers (such as CTLE equalizers) that are configured to optimize the performance of a display system for different data rate ranges. In some described examples, the selection of one(s) of the multiple equalizers is based on the incoming data rate from a display source (such as a display data source). Advantageously, example described herein provides optimized and/or otherwise improved performance across different display modes of operation by utilizing a modular architecture that is scalable with increases in communication channel bandwidth. Advantageously, examples described herein achieve adaptive power consumption by decreasing power consumption with decreases in data rate.

Various forms of the term "couple" are used throughout the specification. These terms may cover connections, communications, or signal paths that enable a functional relationship consistent with the description of the present disclosure. For example, if device A generates a signal to control device B to perform an action, in a first example device, A is coupled to device B by direct connection, or in a second example device, A is coupled to device B through intervening component C if intervening component C does not alter the functional relationship between device A and device B such that device B is controlled by device A via the control signal generated by device A.

Consistent with the present disclosure, the term "configured to" describes the structural and functional characteristics of one or more tangible non-transitory components. For example, a device that is "configured to" perform a function mean that the device has a particular configuration that is designed or dedicated for performing a certain function. A device is "configured to" perform a certain function if such a device includes tangible non-transitory components that can be enabled, activated, or powered to perform that certain function. While the term "configured to" may encompass being configurable, this term is not limited to such a narrow definition. Thus, when used for describing a device, the term "configured to" does not require the described device to be configurable at any given point of time.

Moreover, the term "example" is used herein to mean serving as an instance, illustration, etc., and not necessarily as advantageous. Also, although the disclosure has been shown and described with respect to one or more implementations, equivalent alterations and modifications will be apparent upon a reading and understanding of this specification and the annexed drawings. All such modifications and alterations are fully supported by the disclosure and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in an example particular order, this does not require that such operations be performed in the example particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above does not require such separation in all embodiments.

Descriptors "first," "second," "third," etc., are used herein when identifying multiple elements or components which may be referred to separately. Unless otherwise specified or understood based on their context of use, such descriptors do not impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device, other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While the discussion above suggests that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. An apparatus comprising:

a first equalizer having first and second data inputs, a control input, and first and second data outputs;

a second equalizer having first and second data inputs, a control input, and first and second data outputs, the first data input of the second equalizer coupled to the first data input of the first equalizer, the second data input of the second equalizer coupled to the second data input of the first equalizer, the first data output of the second equalizer coupled to the first data output of the first equalizer, and the second data output of the second equalizer coupled to the second data output of the first equalizer; and a controller coupled to the control input of the first equalizer and the control input of the second equalizer, the controller having an input coupled upstream of the first and second equalizers;

a look-up table coupled to the controller, wherein the look-up table includes a mapping of data rates and data rate controls; and interface circuitry configured to determine a data rate associated with a display data channel;

wherein the controller is configured to:

obtain a data rate control from the look-up table based on the data rate; and use the data rate control to select one of the first equalizer or the second equalizer to provide display data at the data rate to the display data channel.

2. The apparatus of claim 1, wherein the first equalizer and the second equalizer are continuous time linear equalizers.

3. The apparatus of claim 1, wherein the first equalizer and the second equalizer are configured to receive High Definition Multimedia Interface (HDMI) display data at their respective first and second data inputs.

4. The apparatus of claim 3, wherein the first equalizer and the second equalizer are configured to selectively provide the HDMI display data at the first and second data outputs of the first equalizer or the second equalizer responsive to control signals received at the control inputs of the first and second equalizers.

5. The apparatus of claim 1, wherein the controller has an input, and wherein the apparatus further comprising:

storage having an input coupled to an output of the interface circuitry and having an output coupled to the input of the controller.

6. The apparatus of claim 1, wherein the respective first and second data inputs of the first and second equalizers are configured to be coupled to a display data source, and the respective first and second data outputs of the first and second equalizers are configured to be coupled to a display data sink.

7. The apparatus of claim 1, wherein the display data channel is associated with a display data source and a display data sink; and the controller is configured to:

responsive to a first determination that the data rate is a first data rate, turn on the first equalizer; and responsive to a second determination that the data rate is a second data rate, turn on the second equalizer, the second data rate different from the first data rate.

8. The apparatus of claim 7, wherein the controller is configured to, responsive to the second determination, turn off the first equalizer.

9. The apparatus of claim 7, wherein the controller is configured to, responsive to the second determination, turn on the first equalizer.

10. The apparatus of claim 7, further comprising:

a third equalizer having first and second data inputs, a control input, and first and second data outputs, the first data input of the third equalizer coupled to the first data inputs of the first and second equalizers, the second data input of the third equalizer coupled to the second data inputs of the first and second equalizers, the first data output of the third equalizer coupled to the first data outputs of the first and second equalizers, and the second data output of the third equalizer coupled to the second data outputs of the first and second equalizers;

wherein the controller is coupled to the control input of the third equalizer, and the controller is configured to, responsive to a third determination that the data rate is a third data rate, turn on the third equalizer, the third data rate different from the first data rate and the second data rate.

11. The apparatus of claim 1, further comprising:

a first multiplexer having first and second inputs and an output, the first input of the first multiplexer coupled to the first inputs of the first and second equalizers, the output of the first multiplexer is configured to be coupled to a display data sink; and a second multiplexer having first and second inputs and an output, the first input of the second multiplexer coupled to the second inputs of the first and second equalizers, the output of the second multiplexer configured to be coupled to the display data sink.

12. An apparatus comprising:

a display data source having a data output and a display data output;

a controller having an input and first and second outputs, the input of the controller coupled to the data output of the display data source;

a first equalizer having a data input, a data rate input, and an output, the data input of the first equalizer coupled to the display data output of the display data source, and the data rate input of the first equalizer coupled to the first output of the controller; and a second equalizer having a data input, a data rate input, and an output, the data input of the second equalizer coupled to the display data output of the display data source, the data rate input of the second equalizer coupled to the second output of the controller, and the output of the second equalizer coupled to the output of the first equalizer, wherein the controller is configured to:

determine a data rate of data on the display data output;

provide display data from the first equalizer while the second equalizer is turned off in response to a first determination that the data rate is a first data rate; and provide display data from the first equalizer and second equalizer in response to a second determination that the data rate is a second data rate greater than the first data rate.

13. A display system comprising:

a first equalizer having first and second data inputs, a control input, and first and second data outputs;

a second equalizer having first and second data inputs, a control input, and first and second data outputs, the first data input of the second equalizer coupled to the first data input of the first equalizer, the second data input of the second equalizer coupled to the second data input of the first equalizer, the first data output of the second equalizer coupled to the first data output of the first equalizer, and the second data output of the second equalizer coupled to the second data output of the first equalizer; and a controller coupled to the control input of the first equalizer and the control input of the second equalizer, the controller configured to, based on a data rate of display data at the data inputs of the first and second equalizers, select only the first equalizer to provide display data to a display device when the data rate is in a first range and select the first and second equalizers to provide the display data to the display device when the data rate is in a second range, the second range differing from the first range.

14. The display system of claim 13, wherein the second range is greater than the first range.

15. The display system of claim 13, further comprising:

a third equalizer having first and second data inputs, a control input, and first and second data outputs, the first data input of the third equalizer coupled to the first data inputs of the first and second equalizers, the second data input of the third equalizer coupled to the second data inputs of the first and second equalizers, the first data output of the third equalizer coupled to the first data outputs of the first and second equalizers, and the second data output of the third equalizer coupled to the second data outputs of the first and second equalizers.

16. The display system of claim 15, wherein the controller is further configured to select the first, second, and third equalizers in parallel to provide the display data to the display device when the data rate is in a third range, the third range differing from the first range and differing from the second range.

17. The display system of claim 13, further comprising:
a look-up table coupled to the controller.

18. The display system of claim 13, wherein the display device is an HDMI display device that supports different HDMI specifications having different respective data rates.

19. The apparatus of claim 12, further comprising storage having an input and an output, and interface circuitry having a first input, a second input, and an output, wherein:
the first input of the interface circuitry is configured to receive a DDC serial data signal;
the second input of the interface circuitry is configured to receive a DDC serial clock signal; and
the output of the interface circuitry is coupled to the input of the storage, and the output of the storage is coupled to the controller.

* * * * *